July 14, 1925.  
A. H. EDMUNDS  
LATHE  
Filed Sept. 11, 1922   5 Sheets-Sheet 4

1,546,062

Inventor  
Alton H. Edmunds  
By Lancaster and Allwine  
Attorneys

July 14, 1925.  
A. H. EDMUNDS  
LATHE  
Filed Sept. 11, 1922   5 Sheets-Sheet 5

1,546,062

Inventor  
Alton H. Edmunds  
By Lancaster and Allwine  
Attorneys

Patented July 14, 1925.

1,546,062

UNITED STATES PATENT OFFICE.

ALTON H. EDMUNDS, OF SPRINGFIELD, VERMONT.

LATHE.

Application filed September 11, 1922. Serial No. 587,447.

*To all whom it may concern:*

Be it known that I, ALTON H. EDMUNDS, a citizen of the United States, residing at Springfield, in the county of Windsor and State of Vermont, have invented certain new and useful Improvements in Lathes, of which the following is a specification.

This invention relates to improvements in devices for machining tapered surfaces upon articles being worked upon.

The primary object of the invention is the provision of a lathe embodying improved means for machining tapered surfaces upon articles, such as core boxes, and the like, being susceptible of adjustment for boring or machining relatively straight surfaces, or surfaces tapering at any desired pitch.

A further object of the invention is the provision of an improved mechanism for attachment to lathes in order to effect the machining of tapered surfaces.

A further object of the invention is the provision of a lathe of the above described character, adapted for cooperation with a special cutting tool, such as set forth in my copending application, Serial No. 587,446 filed Sept. 11, 1922; being capable of regulating the latter to machine straight or tapered surfaces upon the articles being worked upon.

A further object of the invention is the provision of a machine susceptible of use as an engine lathe, boring machine, or milling machine, as desired.

A further and important object of this invention is the provision of a lathe embodying a rotary cutting tool, in which the blade is susceptible of adjustment; cooperating with a moving piece of work in order that tapered surfaces may be machined in the latter; the machining operation being visible at all times to an operator.

Other objects and advantages will be apparent during the course of the following detailed description.

In the accompanying drawings, forming a part of this specification, and wherein similar reference characters designate corresponding parts throughout the several views.

Figure 2ª is a sectional view taken through the tool head.

In the drawings, wherein for the purpose of illustration is shown a preferred embodiment of my invention, the letter A designates the improved lathe including a bed B; head stock C; tail stock mechanism D; carriage E; driving mechanism F located in the head stock C; rotary cutting tool G; and taper attachment H for use in connection with the carriage E and rotary cutting tool G.

The bed B of the improved lathe A may, of course, be of any formation, to conform to the size and various details of the same, including supporting legs 11, and tracks 12 as details of any ordinary lathe bed construction.

The head stock C is of unusual construction, including a base portion 13 which is hollowed and open to the interior 14 of the bed B. A yoke 15 preferably extends upwardly from the portion 13, and provides the aligning openings 17 and 18 disposed longitudinally of the bed B, for receiving portion of the driving means F to be subsequently described.

The carriage E preferably includes a platform 13ª having grooves in the bottom thereof which receive the tracks 12 of the bed B in order that the same may slide longitudinally of said bed intermediate the head and tail stocks C and D respectively. An L-shaped clamping member 14ª is preferably provided upon the bottom of the carriage platform 13ª cooperating through a slot 15ª in the bed B and engaging the same to prevent elevation of the carriage platform 13ª, while permitting longitudinal sliding thereof.

Figure 9:
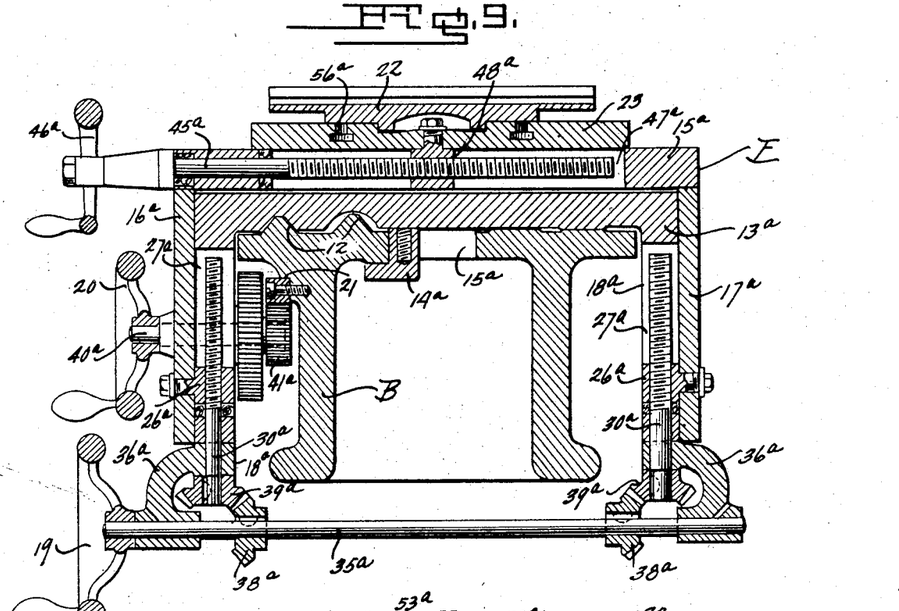
Figure 9 is a transverse cross sectional view, taken through the carriage mechanism showing the adjustable features thereof.

A vertically adjustable platform 15ᵇ is provided upon the carriage platform 13ª, and having front and rear plates 16ª and 17ª for sliding contact against depending sides 18ª of the carriage platform 13ª. Internally screw threaded nuts 26ª are preferably provided upon the inside of the depending platform plates 16ª and 17ª which are vertically slidable within recesses 27ª provided in the carriage platform side 18ª. These nuts are detachably positioned upon the said plates 16ª and 17ª and are provided for receiving screw threaded vertically positioned rods or stems 30ª which are rotatably supported by the sides 18ª of the carriage supports 13ª at their lower ends and which extend into the recesses 27ª. A rod 35ª is horizontally and rotatably carried by arm extensions 36ª of the carriage platform 13ª, and which has pinions 38ª thereon in meshing relation with pinions 39ª affixed upon the lower ends of the screw threaded rods 30ª. A hand wheel 19 is preferably provided upon the forward end of the rod 35ª for rotation thereof, in order that the pinions and rods 30ª may be rotated so that the nuts 26ª may be vertically adjusted upon the screw threaded portions of the rods 30ª for vertical adjustment of the platform or supporting platform 15ᵇ.

The carriage mechanism E preferably includes a stub shaft 40ª having a hand wheel 20 forwardly mounted thereon and also carrying a gear 41ª which is adapted for meshing with a toothed rack 21 carried by the bed B; said shaft 40ª when rotated by the hand wheel 20 so moving the gear 41ª on the teeth of the rack 21 as to move the carriage mechanism longitudinally of the bed B.

Figure 10:
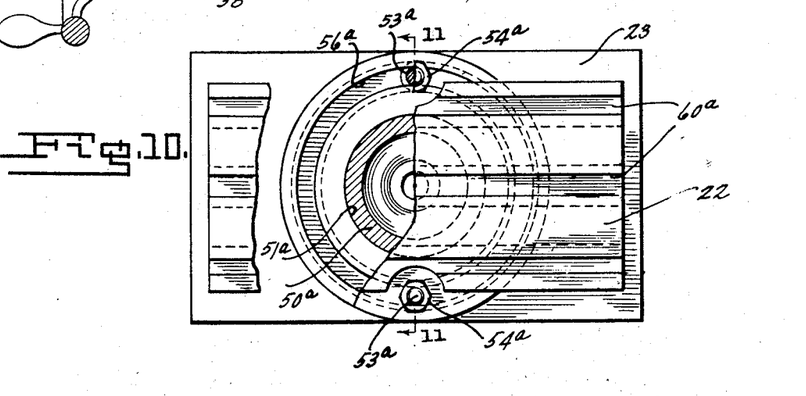
Figure 10 is a fragmentary plan view, partly in section, of the carriage platen.
Figure 11:
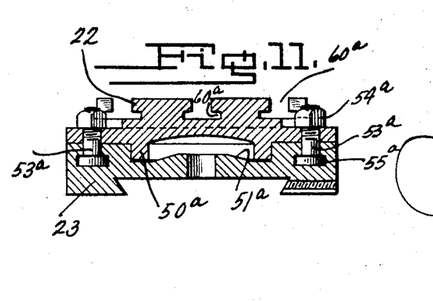
Figure 11 is a cross sectional view, taken substantially on the line 11—11 of Figure 10.

The platform 15ᵇ preferably carries a laterally slidable supporting plate 23 which is dove tailed in slidable manner to the top of the platform 15ᵇ. A screw threaded shaft 45ª is preferably mounted transversely through the platform 15ᵇ and has a hand crank or operating device 46ª forwardly thereof for manually rotating the screw threaded shaft 45ª which extends into the transverse recess 47ª provided in the platform 15ᵇ. A detachable nut device 48ª is preferably carried by the transverse slide or plate 23 and extends into the recess 47ª for detachable and adjustable engagement with the screw threaded shaft 45ª, so that upon rotation of said shaft 45ª, the nut 48ª will be slid in the recess 47ª for transverse adjustment of the slide 23 over the supporting platform 15ᵇ. A swivel block or platen 22 is preferably mounted upon the top of the transverse slide 23, including a depending annular flange 50ª which extends into a circular depression 51ª in the top surface of the transverse slide 23 and permits the platen to rotate upon a vertical axis in a horizontal plane over the transverse slide 23. In order to prevent detachment of the work holding platen 22 with respect to its supporting plate 23, bolts 53ª are preferably provided, having their screw threaded shanks extending upwardly through the platen 22 for receiving nuts 54ª thereon, the heads 55ª of said bolts 53ª being disposed in the enlarged portion of a T-shaped annular groove provided inwardly of the top surface of the platen or swivel support 23, and whereby the platen 22 is rotatably mounted against liability of displacement with respect to the transverse sliding plate 23. In order to determine the degree of angular movement of the platen 22 with respect to the sliding support plate 23, suitable indicia 57ª designating degrees may be provided upon the outer surface of a circular portion 58ª of the platen 22, which cooperates with an indicator mark 59ª disposed upon the supporting plate 23. The T-slots 60ª provided inwardly of the top surface of the swivel platen 22 are for receiving certain securing elements of the clamps 25, which are positioned in adjustable and detachable relation upon the platen 22 for the detachable and adjustable securing of the work K thereon. Thus, it can be seen that a piece of work K disposed upon the platen 22 may be adjusted in various ways, either longitudinally of the bed B; vertically thereof; laterally thereof; or rotated in a horizontal plane thereon.

The driving means F preferably includes a hollow shaft 30 provided with the bearing caps 31 and 32, disposed respectively in the head stock openings 17 and 18, and whereby the shaft 30 may be rotatably mounted longitudinally of the lathe bed B. The bearing cap arrangement 31 adapted for journalling the outside end 32 of the hollow shaft 30, includes a ball bearing supporting structure 33 of any approved formation for clamping of the nut 34 thereagainst, and whereby the tapered surfaces 35 and 36 of said hollow shaft may be forced into their tapered seats in the bearing sleeves 31 and 32 respectively. Suitable oil rings 37 may be provided in each of the bearing sleeve structures 31 and 32, operating in drip pockets 38 provided in the head stock structure C. The axial bore 39 extends entirely through the hollow shaft 30 and is open upon both sides of said head stock.

A pulley drum structure 40 is provided for fixed mounting upon the hollow shaft 30, intermediate the ends thereof and immediately beneath the yoke structure 15 of the head stock C, including a plurality of pulleys 41 of different diameters, for receiving a belt (not shown) in order that the shaft 30 may be driven at high, low, or intermediate speeds.

Figures 2, 2A, 3:
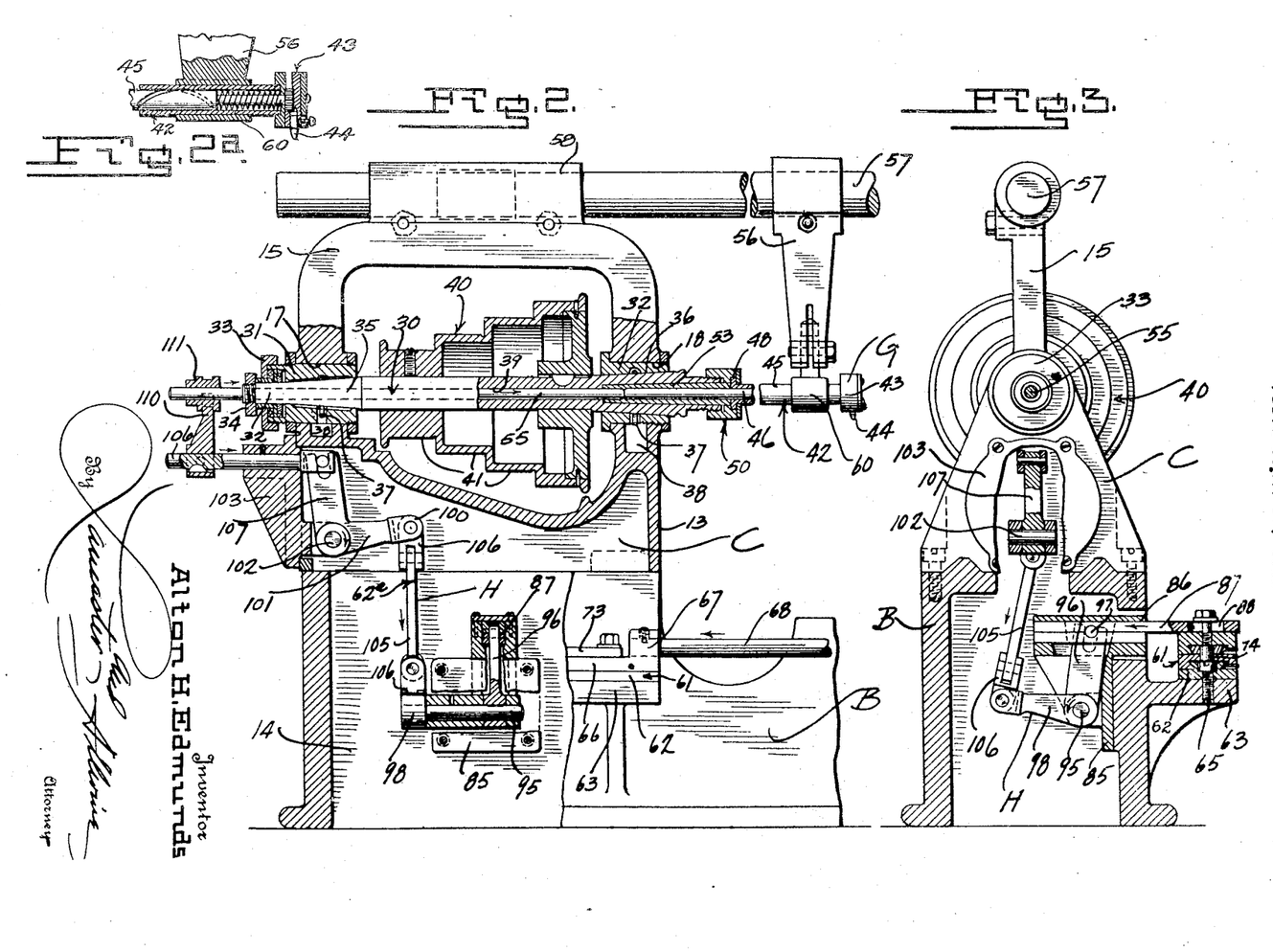
Figure 2 is a fragmentary view partly in section, illustrating the novel mechanism therefor, and whereby tapered surfaces may be machined in articles worked upon.
Figure 3 is a transverse cross sectional view taken through the improved lathe.
Figure 4:
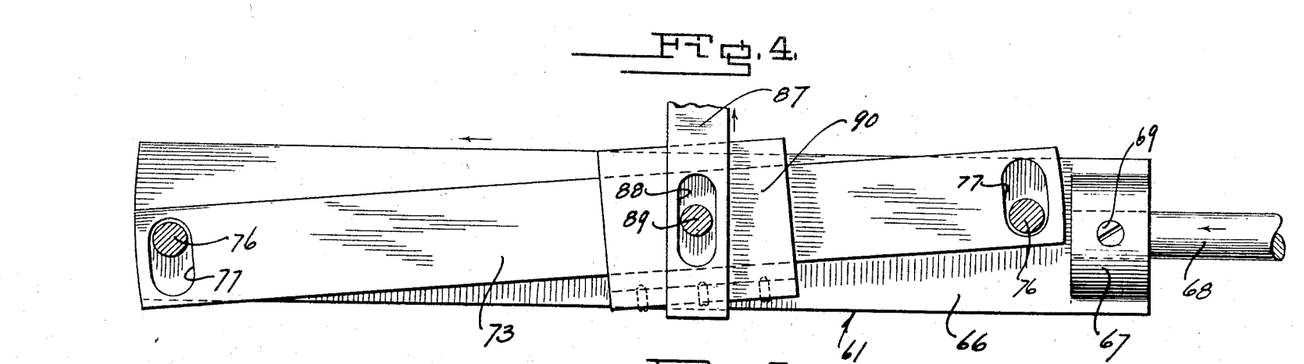
Figure 4 is a plan view partly in section, showing a regulating mechanism as used in connection with the cutting of a tapered surface upon an article being worked upon.
Figure 5:
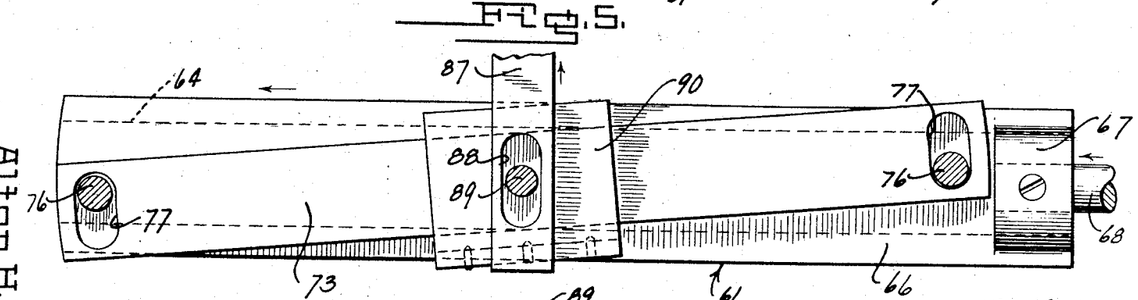
Figure 5 is a view similar to Figure 4 but showing the slide moved to the right of the position shown in Figure 4.
Figure 6:
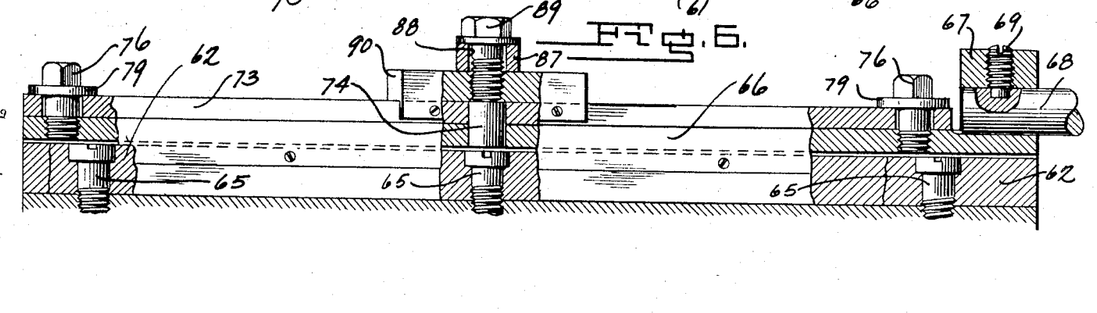
Figure 6 is a longitudinal cross sectional view taken through the regulating mechanism illustrated in Figures 4 and 5.

The cutting tool G is of that type specifically described in my copending application, Serial No. 587,446 filed September 11, 1922 and includes a casing 42, including a cutter head 43 disposed in a vertical plane, and radially from which the blade 44 extends for cutting operation. The sleeve portion 45 of the casing 42 extends axially from the head 43, and is provided with a plunger member 46 reciprocably disposed therein, and whereby the blade 44 may be advanced or retracted as desired, for effecting the machining operation. The end of this casing sleeve 45 may be flanged as at 48, and whereby the casing 42 may be securely fixed within a chuck structure 50, detachably mounted upon the end of the hollow shaft 30 which extends from the head structure C toward the carriage E. In this relation, the member 46 is horizontally disposed with the blade 44 operating in a vertical plane. If desired, a bearing lining 53 may be provided inwardly from the end of the shaft 30 upon which the chuck structure 50 is mounted, in order that the plunger member 46 may bear therein; since this plunger member 46 rotates with the cutting tool G. It should be noted that the plunger member 46 extends only a short distance in the passageway or bore 39 of the hollow shaft 30, and cooperates with the rod 55 which is slidable therein, and which forms a part of the attachment H to be subsequently described.

A drop hanger or steady rest 56 may be provided, depending from an overhead bar 57, which is mounted in suitable sleeves 58 and 59 of the lathe stocks, and provided with a lower sleeve end 60 serving as a journal box for the tubular casing portion 45 of the tool G. By this arrangement, the outer end of the tool G adjacent the blade 44 is supported and steadied.

Referring to the attachment H, the same principally includes a regulating mechanism 61, and a linkage arrangement 62ª adapted for cooperating intermediate the regulating mechanism 61 and rod 55, in order to effect a movement of the latter for control of the blade 44 in such manner that the same may machine straight or tapered surfaces of any degree.

The regulating mechanism 61 preferably includes a base piece 62 of elongated appearance, secured upon the upper surface of a shelf like flange 63, which extends outwardly from the forward wall of the bed B. This base piece 62 is provided upon the guide strip 64 longitudinally thereof upon the upper surface, and thru the upper surface of which guide strip 64, the screws or other securing elements 65 are positioned, in order that the base piece 62 may be secured to the flange shelf 63. In this position the guide strip 64 extends longitudinally of the lathe bed, for cooperation with an elongated slide member 66 grooved upon its under surface for receiving the guide strip 64 in dovetailed manner. This slide member 66 is movable longitudinally of the base piece 62 in a defined path, as determined by the strip 64. The end of the slide 66 nearest the carriage E, is provided with an upstanding lug 67 adapted to detachably receive a rod 68 which is affixed in an aperture of this lug 67 by means of a set screw 69. The opposite end of the rod 68 may be clamped by a set screw 70 to a portion of the carriage E. By this arrangement, the slide plate 66 is reciprocated over its base 62 by movement of the carriage E along the lathe bed B.

Figure 7:
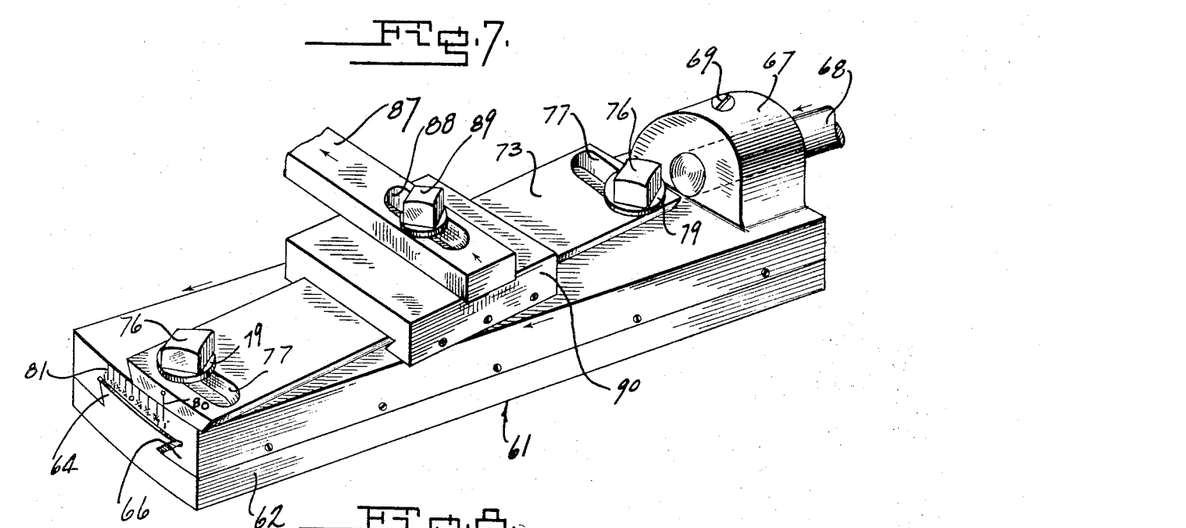
Figure 7 is a perspective view of the regulating mechanism, showing the various assembled details thereof.
Figure 8:
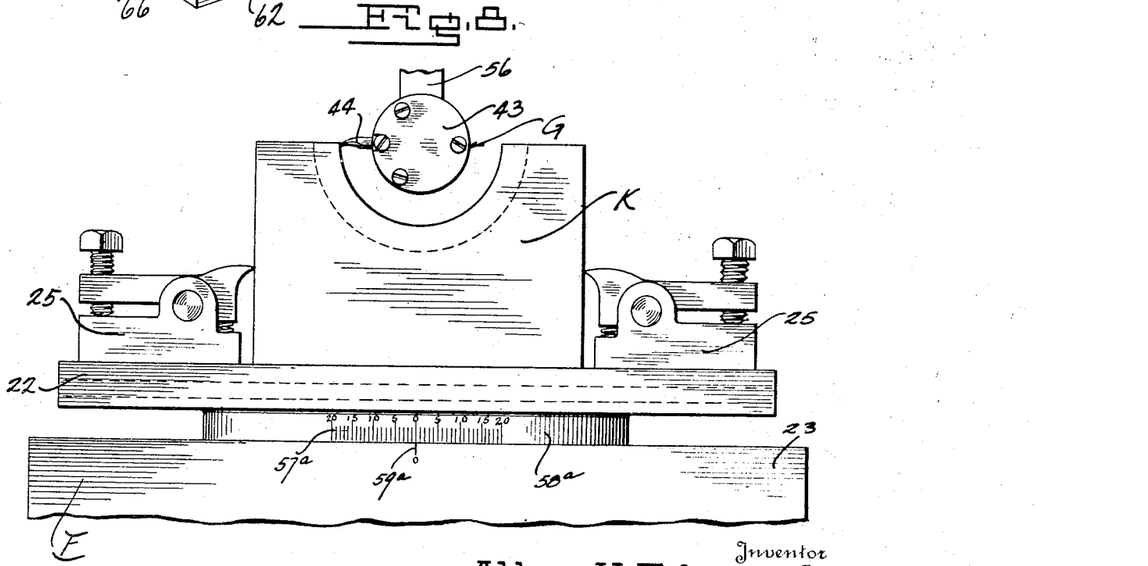
Figure 8 is a side elevation, showing the relation of a cutting tool upon a piece of work, upon which it is desired to cut a tapered surface.

An adjustable key member 73 is provided upon the slide 66, and pivoted thereto substantially midway of its ends by a pin 74. In this manner the adjustable member 73 extends substantially longitudinally upon the slide 66, and is capable of adjustment upon the top surface thereof as determined by the stop screws or pins 76, the shanks of which are loosely disposed through arcuate slots 77, in the extreme ends of the adjustable member 73, with said pins 76 detachably engaging in the slide 66. Suitable washers 79 are provided beneath the heads of each of the clamping stop pins 76 resting upon the top surface of the adjusting member 73, and whereby the pins 76 may be tightened to clamp the washer 79, in order to hold the member 73 in rigid adjusted position. The member 73 may be so positioned upon the slide 66 as to have the longitudinal axis thereof arranged parallel to the axis of said slide 66, or the same may be swung to either side of the axis of said slide 66, in order that the axis of the member 73 may be adjusted in acute angular relation with respect to the angular axis of the slides. As is indicated in Figure 7, it is preferred that an indicator mark 80 be provided upon an end face of the adjustable member 73 which is opposite that end facing 67; this indicator mark cooperating with a series of delineations 81 graduated upon the end face of the slide 66 which is arranged adjacent the indicator mark 80. When the indicator mark 80 is arranged over that delineation 81 which reads "zero", the longitudinal axis of the adjustable member 73 is aligned with the longitudinal axis of the slide 66. By movement of the member 73, so that the indicator mark 80 thereof is on a delineation 81, either to the right or left of the zero mark, by swinging the same upon its pivot pin 74, it is obvious that the member 73 then defines a path of travel, the axis of which lies in acute angular relation with respect to the longitudinal axis defined by the slide strip 66 and the guide member 64 upon which the same operates.

A bracket 85 is preferably provided with the regulating mechanism 61, attached to the bed B in any suitable manner, and providing a horizontal way 86 extending interiorly of the bed B, and in which an operating slide 87 is positioned for snug reciprocation transversely of the lathe bed B, and substantially at right angles to the alignment of the slide 66 above described. The outer end of the slide arm 87 is provided with a slot 88 extending longitudinally thereof and adapted for receiving a clamping screw or pin 89, which is adapted for attachment in a block 90 slidably dove tailed onto the adjustable member 73 above described. The linear motion of the slide arm 87, occasioned by movement of the carriage E through the regulating mechanism 61 is obvious. As the carriage E is moved longitudinally upon the bed B toward the head stock C, in order to move the work K against the cutting tool G, the rod 68 will cause the slide 66 to move outwardly in a defined path upon its base member 62. According to the angular adjustment of the member 73 upon the slide 66, the block 90 will be moved slightly transversely of the regulating mechanism 61, and due to the clamping of the slide arm 87 thereon, the slide arm 87 will be moved inwardly of the bed B transversely thereof for moving the linkage mechanism 62ª.

The function of the linkage mechanism 62ª is that of transmitting motion from the regulating mechanism 61 to the operating rod 55, in order to control the cutting tool G. The same preferably includes a rocker shaft 95 bearing in the bed bracket 85, and having an arm 96 extending upwardly therefrom and provided with a bifurcated end to operably engage a pin 97, which is transversely keyed in the slide 87. A second arm 98 is keyed upon an end of the rocker shaft 95, offset with respect to the arm 96, in order that the same may lie below the free end 100 of a bell crank 101, which is pivoted upon a pin 102 carried by a bracket structure 103, which is mounted in any suitable manner to the head stock C of the lathe, immediately below the operating shaft 30. A connecting rod 105 is provided within the bed B, having the end joint links 106 thereon, for connecting the moving ends of the lever arms 98, and 101, in order that movement may be transmitted to the bell crank lever 101 through rocking of the lever 96. A control shaft 106 is reciprocably disposed in the bracket 103, preferably slidably disposed therein parallel of the axis of the operating shaft 30, so that the free end of the lever 107, which forms part of the bell crank 101, may engage the same for sliding action in the bracket 103. A clutch arm 110 is preferably mounted upon the control rod 106 outwardly of the head stock C, and cooperating with a clutch sleeve 111 mounted upon the end of the shaft rod 55 which extends outwardly of the control shaft 30.

In operation, the core box K, or other piece of work, upon which it is desired to operate in the provision of a tapered surface thereon, is suitably clamped by the structures 25 upon the swivel plate 22. In order that the cutting tool C will machine the proper taper upon the piece of work K, the indicator mark 80 is set to that delineation 81, which determines the pitch of the tapered surface which it is preferred to machine in the work K. This regulating mechanism 73 having been properly set as above described, the belt is placed upon the pulley drum 40, in order that the shaft 30 will rotate at a very high speed ratio, and the work K is moved against the rapidly rotating cutting blade 44. As the carriage E is advanced for moving the work K against the cutting tool G, the rod 68, of course, moves the sliding arm 87 transversely of the bed B thru the regulating mechanism 61, and in distance, according to the setting of the adjusting member 73 thereon. It is apparent that the movement of the slide arm 87 synchronizes with movement of the carriage E. The various lever arms and connecting pieces of the linkage mechanism 62ª will move the control rod 106 inwardly of the bed B, as the work K is advanced against the cutting tool G. This operation, will have the effect of pushing the plunger rod 55 inwardly along the bore of the rapidly rotating shaft 30, and due to the fact that the end of this rod 55 contacts the end of the blade adjusting plunger 46, the latter will be advanced toward the disc head 43, in order to radially extend the cutting blade 44 according to the manner described in my copending application.

Figure 1:
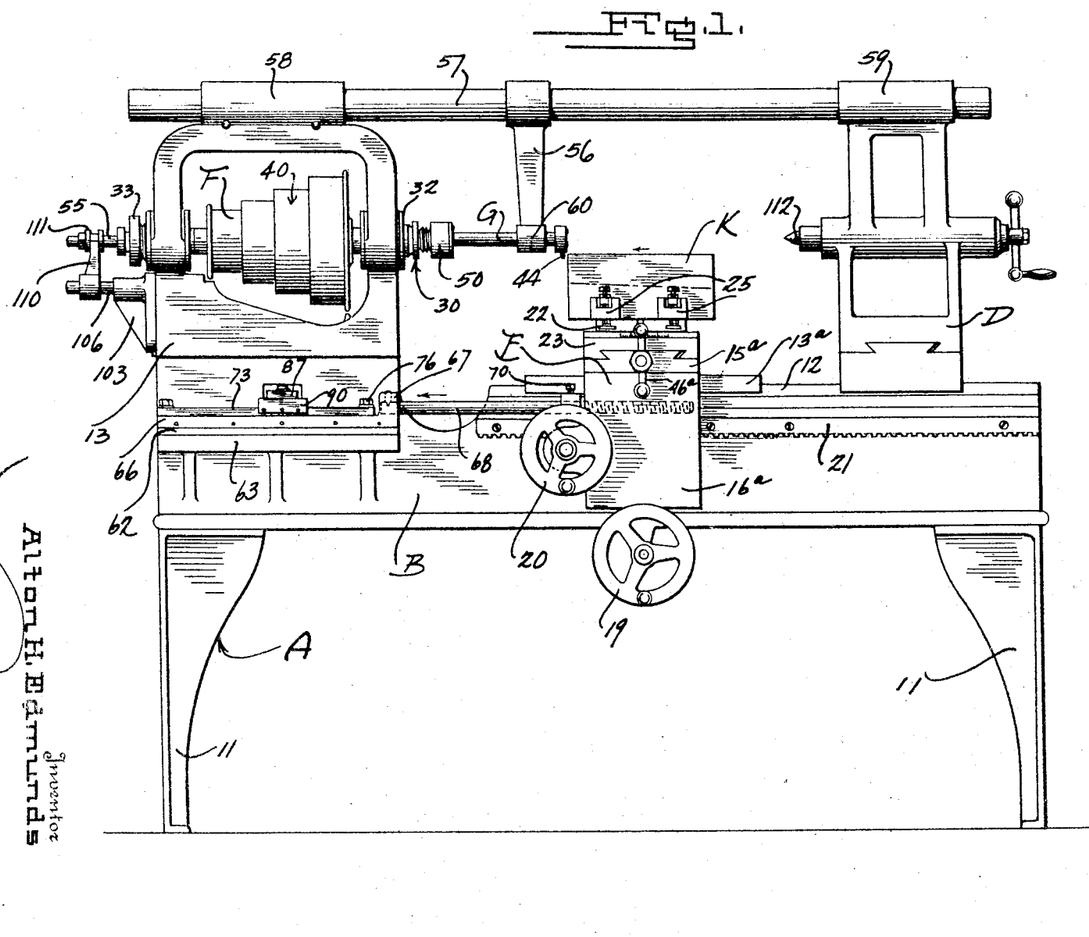
Figure 1 is a side elevation of the improved lathe, showing the improved details thereof.

This operation of sliding the carriage E in advancing the work K will, of course, uniformly extend the cutting blade 44 in accordance with the manner in which the regulating key 73 is adjusted upon the mechanism 61, and cut the bore in tapered manner within the work K as is illustrated in Figure 1.

This operation upon the work K, is at all times, visible to an operator, and the effectiveness of the tool G in connection with machining of a surface upon the work K. In contra-distinction to most type of machines embodying means for machining a tapered surface, the cutting tool G is the rotated part, and the work K remains stationary, except in so far as longitudinal advancement of the same is concerned, being disposed below the cutting tool G in order to make the entire operation visible to the lathe operator.

If desired, a tail stock spindle 112 may be provided, axially aligning with the shaft 30. By the provision of this spindle, the lathe can be readily converted into a regular pattern making lathe, and work may be clamped upon the spindle, intermediate the head and tail stock for turning purposes, in order that cylindrical cutting may be effected thereon.

From the foregoing, it can be seen that a spindle type of lathe has been provided, in which a practical working attachment is embodied for control of a cutting tool, in order that tapered surfaces may be bored or otherwise machined upon articles. The lathe is particularly well adapted as an engine lathe in the formation of core boxes, and can readily bore the tapered surface of the core box in a fraction of the time which it takes to form the same upon the ordinary types of buzz planers in which the work is placed above the cutting tool. It is also an important feature of this invention that straight surfaces or straight line bores may be machined upon articles merely by arranging the guide strip 73, so that the zero mark thereon aligns with the zero delineation 81, or the same effect may be secured by releasing the set screw 69. On the other hand, the angle of taper may be varied, at will, without changing the setting of the work upon the carriage E.

Various changes in the shape, size and arrangement of parts may be made to the form of the invention herein shown and described, without departing from the spirit of the invention or the scope of the claims.

I claim:

1. A device of the class described comprising a supporting frame, a cutting tool including a blade movable therein, a work supporting member, and means operatively connecting the latter with the cutting tool for advancing or retraction of the blade upon movement of the work supporting member and including a cam element having movement longitudinally of the work supporting member and moved thereby and angularly adjustable, and an element slidably receiving the cam element and moved transversely of the work supporting member.

2. A device of the class described comprising a supporting frame, a cutting tool including a blade movable therein, a work supporting member, a support slidable longitudinally of said frame and connected with said work supporting member for receiving movement therefrom, a cam forming guide extending longitudinally of said support and angularly adjustable thereon, and adjusting means for said blade including an element slidably receiving said guide whereby upon movement of said support said element may have movement transversely of the support in accordance with the angular position of the guide and the blade advanced or retracted and tapered surfaces of various angular pitches may be machined upon work.

3. As an article of manufacture, a regulating device comprising a support, an elongated member slidable in a defined path upon said support, a guide strip pivotally mounted intermediate its length upon said elongated member and constituting a cam adapted to be releasably secured in a set position upon the elongated member, and a block slidably receiving the guide strip and moved transversely of the elongated member by the cam when the elongated member is moved longitudinally.

4. A lathe of the class described comprising a frame, a hollow shaft rotatably mounted in said frame, a work supporting carriage adjustably mounted upon said frame, a cutting tool mounted upon said hollow shaft for rotation therewith including a blade and a blade adjusting member, a rod adjustably disposed in said hollow shaft for engaging said blade adjusting member, a sliding member connected to said carriage for movement thereby in a defined path, a guide piece adjustably disposed on said slidable member, a block slidably disposed upon said guide piece, and a linkage mechanism connecting said block and said rod to effect movement of the latter within the hollow shaft for blade adjusting purposes.

5. In a device of the class described, the combination of a frame, a hollow shaft rotatably mounted in said frame, a work supporting carriage adjustably mounted upon said frame, a cutting tool including a blade and a blade adjusting member mounted upon said shaft for rotation therewith, an operating rod disposed in said shaft for engagement against said blade adjusting member, means connected to said adjustable carriage for effecting a selective linear motion, a rocker shaft, lever arms connected to said rocker shaft, one of which engages said means for rocking of the shaft by said linear motion, a bell crank lever pivoted for movement in a plane parallel of the shaft axis, joint links upon an arm of said bell crank, and upon the other arm of the rocker shaft, a connecting rod engaging said joint links, a regulating rod slidable in said frame and engaging the bell crank for operation thereby, and a clutch mounted upon said regulating rod and engaging the rod slidable in said hollow shaft to effect movement relative to said shaft for moving said blade adjusting member.

6. A lathe of the class described comprising a bed, a head stock, a work supporting carriage adjustable upon said bed, a hollow shaft rotatably mounted within said head stock, a pulley mechanism mounted upon said hollow shaft, a cutting tool mounted upon an end of said hollow shaft for rotation therewith and including a blade operating in a vertical plane, and a blade adjusting plunger movably disposed in the hollow of said shaft, a rod longitudinally slidable in the hollow of said shaft and adapted for engagement against an end of said blade plunger, a slide member movable longitudinally of the bed of said lathe and connected for movement with the work supporting carriage, a guide strip adjustably mounted upon said slide whereby the axis thereof may be angularly adjusted with respect to the path of travel of said slide, a block movably mounted upon said guide strip, a rocker shaft, lever arms upon said rocker shaft, means connecting one of said rocker arms for oscillation of the shaft upon linear movement of the block by movement of said guide strips as defined by the slide upon which the same is mounted, a bell crank lever pivoted upon said head stock movable in a plane parallel of the axis of said hollow shaft, means connecting an arm of said bell crank to an arm of said rocking shaft, and clutch means engaging another arm of said bell crank for connection of the latter to the rod movable in said hollow shaft, and whereby movement of the carriage upon the lathe bed to operate a piece of work against said cutting blade will effect movement of said blade adjusting plunger for radial extension of the blade for taper cutting purposes.

7. In a lathe the combination of a supporting frame, a movable blade construction, a work supporting carriage movable upon the supporting frame, and means operatively connecting the work supporting carriage with the movable blade construction for advancement or retraction of the blade upon movement of the work supporting carriage, said means including a regulating device to vary the ratio of blade advancement and retraction with respect to carriage movement.

ALTON H. EDMUNDS.